March 12, 1968   C. C. MAGLINGER   3,372,508
OUT-OF-THE-WATER FISHING LURE
Filed June 28, 1965

INVENTOR
CALVIN C. MAGLINGER

BY *Watson, Cole, Grindle & Watson*
ATTORNEYS

United States Patent Office 3,372,508
Patented Mar. 12, 1968

3,372,508
OUT-OF-THE-WATER FISHING LURE
Calvin C. Maglinger, 1430 St. Marys Ave.,
Owensboro, Ky. 42301
Filed June 28, 1965, Ser. No. 467,515
3 Claims. (Cl. 43—43.15)

ABSTRACT OF THE DISCLOSURE

An out-of-the-water fishing lure for game fish uses undamaged live bait tied to a hook supported upon a float extension completely out of the water. The line is tied on a float extension under water to permit manipulation of the bait and use as a hand line without poles. Loss of bait by whip lash effect is eliminated by attachment of the hook to a stiff float extension.

---

This invention relates to fishing lures and more particularly it relates to fishing lures that may incorporate live bait such as insects.

Several problems are posed with the use of live bait. One is the ability to keep the bait alive and active. Thus a hooked grasshopper, for example, does not stay alive long when floated on or immersed in the water.

Another problem is the whiplash effect which tends to strip live bait from a hook when casting at the end of a line.

Furthermore it is difficult to determine whether the hook is baited after a bite or strike without pulling in the line.

Selective fishing for game fish is desirable and can be accomplished in some cases only with a movable lure and an expensive rod-reel array. Even then it is difficult to locate a hooked lure in the vicinity of seaweed without fouling the hooks.

Accordingly it is an object of this invention to resolve the foregoing problems by provision of a unique fishing lure rig.

It is a further object of the invention to provide a lure which permits the angler to see the fish strike.

A general object of the invention is to provide an improved fishing lure for game fish.

Therefore in accordance with this invention the lure and hook is held out of the water by a float so that a game fish must jump out of the water to take the lure. Preferably the lure is a live insect such as a grasshopper held on the hook by a string. Thus a hook with three ganged prongs can provide a nest for holding the insect in place. The float is counterbalanced and provides for connecting the line underwater so that the bait may be dunked by a slight tug to activate it. A pole or reel need not be used since the float can be thrown in position, and need not be moved continuously to attract game fish.

Figure 1:
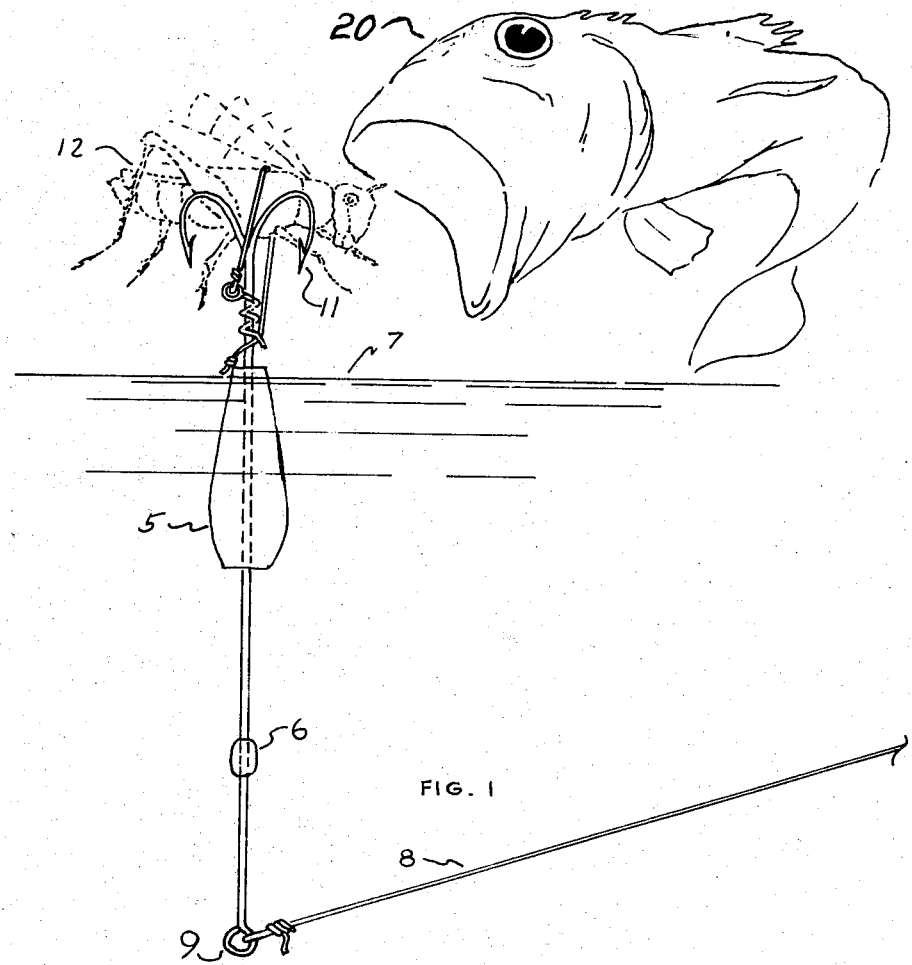
Figure 2:
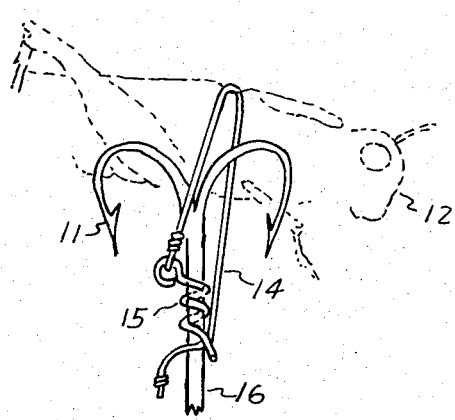

These and further objects and features of the invention will be described with particularity in the following specification with reference to the accompanying drawing, in which:

FIGURE 1 is a sketch of an out-of-water lure provided in accordance with this invention; and FIGURE 2 is an enlarged view of an arrangement provided for mounting a live insect.

As seen in FIGURE 1, the float 5 has a counterweight 6 below water level 7 to cause it to remain vertically suspended for connection of line 8 to the loop 9 in the shank of the float. This holds hook 11 above the water level 7 for attachment of a grasshopper 12 by means of string 14 affixed to the coil of wire 15 about the hook shank 16.

The ganged hook 11 has three prongs meeting at the shank 16 to provide a nest for holding the grasshopper by the single string 14 which is readily tightened and held in the coil spring 15.

It is seen that a slight tug on line 8 will serve to dunk the bait by pivoting the rig about its dead center and this causes the insect to become active after the lure automatically rights itself. Actually the float 5 could be shaped to look like a twig upon which the grasshopper 14 had alighted.

By locating the lure and hook 11 out of the water, only game fish will be attracted, and thus a striking fish 20 will leap out of the water to grab the lure. This adds a thrill to game fishing since all strikes may be seen. Also the bait is always available for visual inspection and is held out of the water where it need not be trolled, so that snags are not often encountered.

The line may be cast by throwing the float rig and thus a pole and reel is not necessary, even for game fishing when using this lure.

Insects stay alive and active for several reasons. The string attachment does not require hooking, and yet with the multiple-pronged hook serving as a nest it holds the live bait securely in place so that it may actively move without becoming released. Furthermore, the insect will not become drowned, or stunned with casting. Because of fixture to the float, the bait is not subject to the whiplash action usually encountered upon casting, which will tend to stun the insect or tear it from the hook.

Accordingly a new and improved fishing lure is provided by this invention with features of novelty defined in particularity in the appended claims.

What is claimed is:

1. A fishing rig comprising in combination a float with a stiff rod extending through the float and with one end of the stiff rod held substantially vertically out of the water and another end of the stiff rod including a heavier-than-water weight held substantially vertically below the float under the water, means below the water for attaching a fish line to the other end of the stiff rod to thereby pivot the stiff rod and the float generally at the water surface by pulling on said line, and means on the end of the rod above the water and including a hook for mounting a lure.

2. A fishing rig comprising in combination a float, a member including a hook held out of the water by said float for access by a fish jumping out of the water, means for holding a live insect on said hook, said means comprising a string and a member affixing it about the shank of the hook, and wherein the hook comprises at least three ganged prongs meeting at the shank to provide a nest for holding a live insect in place and out of the water by said string.

3. The combination defined by claim 2 wherein the member affixing the string about the shank of the hook comprises a coil of wire about the shank.

References Cited

UNITED STATES PATENTS

| | | | |
|---|---|---|---|
| 1,062,726 | 5/1913 | Nelson | 43—44.4 |
| 2,456,254 | 12/1948 | Caruso | 43—43.15 |
| 2,792,663 | 5/1957 | Sinclair | 43—43.15 |

SAMUEL KOREN, *Primary Examiner.*

D. J. LEACH, *Assistant Examiner.*